J. M. Wilcox.

Potato Digger.

Nº 67,148.  Patented Jul. 23, 1867.

Witnesses;
Geo. D. Walker
Chas H Smith

Inventor;
J. M. Wilcox
per L. W. Sewell
Atty

United States Patent Office.

JOHN M. WILCOX, OF ALBANY, NEW YORK.

Letters Patent No. 67,148, dated July 23, 1867.

IMPROVEMENT IN POTATO-DIGGER.

*The Schedule referred to in these Letters Patent and making part of the same.*

TO ALL WHOM IT MAY CONCERN:

Be it known that I, JOHN M. WILCOX, of the city and county of Albany, and State of New York, have invented and made a certain new and useful Improvement in Potato-Diggers; and I do hereby declare the following to be a full, clear, and exact description of the said invention, reference being had to the annexed drawing, making part of this specification, wherein—

Figure 1:
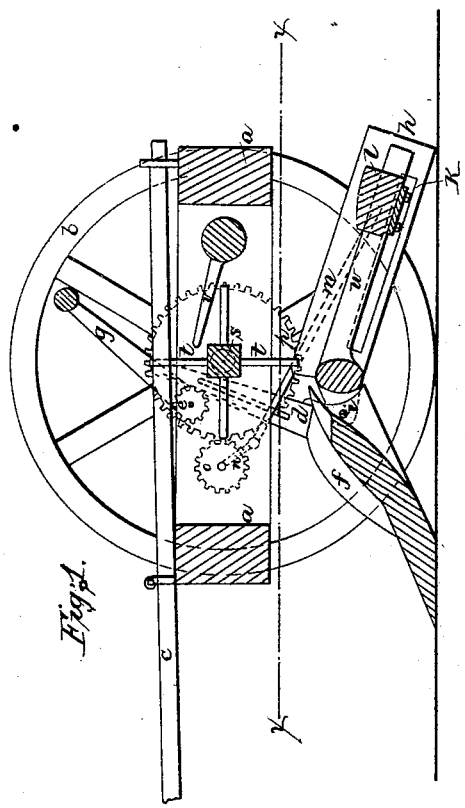
Figure 2:
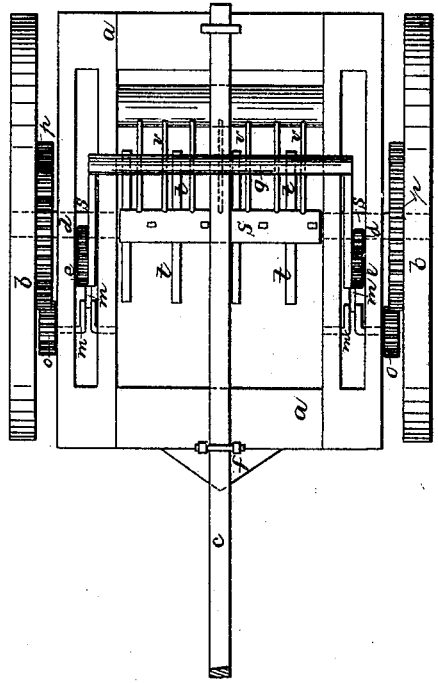
Figure 3:
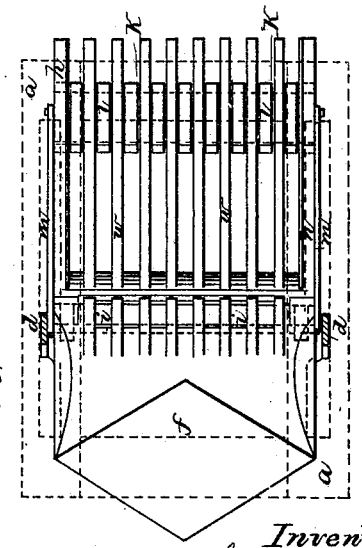

Figure 1 is a vertical longitudinal section of the said potato-digger.
Figure 2 is a plan of the said machine, and
Figure 3 is a plan below the line $x\ x$, fig. 1.

Similar marks of reference denote the same parts.

My said invention consists in a revolving raking apparatus that acts upon the vines, earth, and potatoes as they are raised by a plough or scoop, and passes them upon a reciprocating separator; and I combine therewith a series of standing knives that cuts to pieces the vines or weeds that may wind around the revolving raking apparatus. By this construction of apparatus I prevent the weeds being buried by the earth and obstructing the machine, or preventing the potatoes separating freely from the earth.

In the drawing, $a$ is a frame of suitable size and strength, supported by the wheels $b\ b$, and $c$ is the pole for the attaching of horses or other animals. In the frame $a$ are mortises for receiving the standards $d\ d$ that extend up from the shoe or plough $f$, and on these standards are rack-teeth acted upon by the segments $e\ e$ and levers $g$, so that the plough can be raised for going to the field or lowered for use. At the sides and to the rear of the plough $f$ are the side-frames $a$, attached to the plough by the bolt $i$, forming a hinge that allows a certain amount of motion to the frames $h$ and the separator they carry, so that it may draw over the surface of the ground. The separator $w$ is formed of a series of bars, beneath which is a cross-bar, $k$, that has on it the fingers $l$ that project up through the openings between the bars of the separator, and the said bar $k$ and its fingers are given a reciprocating motion by the connecting-rods $m\ m$ and cranks $n\ n$ that receive motion from the pinions $o\ o$ and wheels $p\ p$ upon the axle of the supporting-wheels $b$. Upon the axle $s$ of the wheels $b$ is the revolving raking apparatus $t$, formed of a series of arms extending out from said axle, and these, as the machine is drawn along, pass the vines and weeds to the rear, and aid in delivering the earth and potatoes upon the separator $w$. And this revolving raking apparatus also tends to draw the weeds and vines up and keep them from being buried in the earth. To prevent the weeds and vines, as they are drawn up on the rear side of the revolving rake $t$, being wound around said rake, I make use of the stationary knives $v$ that cut said vines and weeds so that they fall off the said revolving rake upon the surface of the ground.

What I claim, and desire to secure by Letters Patent, is—

The revolving raking apparatus $t$ and standing knives $v$, in combination with the plough or scoop $f$ and separator $w$, substantially as and for the purposes set forth.

I also claim the reciprocating fingers $l$, actuated in the manner specified, in combination with the separator $w$ and plough $f$, as set forth.

In witness whereof I have hereunto set my signature this sixth day of December, A. D. 1866.

J. M. WILCOX.

Witnesses:
CHAS. H. SMITH,
GEO. D. WALKER.